United States Patent
Kikuchi et al.

(10) Patent No.: US 6,195,126 B1
(45) Date of Patent: *Feb. 27, 2001

(54) APPARATUS AND METHOD UTILIZING A SINGLE IMAGE MEMORY HAVING A LUMINANCE REGION FOR STORING LUMINANCE DATA, A CHROMATIC REGION FOR STORING CHROMATIC DATA, A CHARACTER REGION FOR STORING CHARACTER DATA, AND A PATTERN REGION FOR STORING PATTERN DATA

(75) Inventors: Akihiro Kikuchi, Chiba; Tomohiro Yamada, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,284

(22) Filed: Jul. 18, 1996

(30) Foreign Application Priority Data

Jul. 19, 1995 (JP) .................................................. 7-205361

(51) Int. Cl.[7] .............................. H04N 5/76; H04N 5/262
(52) U.S. Cl. ........................... 348/232; 348/239; 348/231
(58) Field of Search .................................. 348/231, 232, 348/233, 584, 589, 239; 386/4, 38, 52, 65, 117; 358/906, 909.1

(56) References Cited

U.S. PATENT DOCUMENTS

| 5,333,061 | * 7/1994 | Nakashima et al. | 386/52 |
|---|---|---|---|
| 5,428,389 | 6/1995 | Ito et al. | 348/231 |
| 5,434,618 | 7/1995 | Hayashi et al. | 348/231 |
| 5,477,264 | 12/1995 | Sarbadhikari et al. | 348/231 |
| 5,550,597 | * 8/1996 | Wada et al. | 348/708 |
| 5,579,057 | * 11/1996 | Banker et al. | 348/589 |
| 5,587,740 | * 12/1996 | Brennan | 348/239 |
| 5,633,678 | * 5/1997 | Parulski et al. | 348/239 |
| 5,806,072 | * 9/1998 | Kuba et al. | 348/231 |
| 6,002,797 | * 12/1999 | Mori et al. | 348/589 |
| 6,104,864 | * 12/1999 | Kondo et al. | 386/117 |

FOREIGN PATENT DOCUMENTS

| 6-253251 | 9/1994 | (JP) . |
|---|---|---|
| 6-350951 | 12/1994 | (JP) . |

* cited by examiner

Primary Examiner—Wendy Garber
Assistant Examiner—Jacqueline Wilson
(74) Attorney, Agent, or Firm—Frommer Lawrence & Haug, LLP.; William S. Frommer; Dennis M. Smid

(57) ABSTRACT

A video signal processing apparatus and method for use with an electronic still camera or the like. An image memory is utilized which has a luminance data region for storing luminance data, a chromatic data region for storing chromatic data, a character data region for storing character data, and pattern data region(s) for storing pattern data. Character data and pattern data stored in the character data region and the pattern data regions may be combined with and/or incorporated into luminance data and chromatic data stored in the luminance data region and the chromatic data region. As a result, a dedicated ROM is not needed and information pertaining to an image photographed may be prevented from being loss. A video signal based on an image of an original photograph may be stored in original form when characters and patterns are incorporated into the image of the photograph.

29 Claims, 8 Drawing Sheets

APPARATUS AND METHOD UTILIZING A SINGLE IMAGE MEMORY HAVING A LUMINANCE REGION FOR STORING LUMINANCE DATA, A CHROMATIC REGION FOR STORING CHROMATIC DATA, A CHARACTER REGION FOR STORING CHARACTER DATA, AND A PATTERN REGION FOR STORING PATTERN DATA

BACKGROUND OF THE INVENTION

The present invention relates to a video processing apparatus and method and, more particularly, to such apparatus and method for use with an electronic still camera for recording and/or reproducing still image digital video signals onto and/or from a recording medium such as an optical disk, a magneto-optical disk or a semiconductor memory.

In a digital recording type electronic still camera, an image of an object may be supplied through a photographing or charge coupled device (CCD) so as to obtain a video signal. Such video signal may be converted to digital form and compressed in accordance with an image compression technique of the Joint Photographic Experts Group (JPEG). The JPEG technique may compress still image data by using a discrete cosine transform (DCT) and length-variable coding. As a result, such JPEG technique may be able to compress colored still image data with a relatively high compression ratio, such as 1 to 1/100. The digital compressed video signal may thereafter be recorded on a recording medium.

The recording medium may be a magneto-optical disk which is contained in a housing or cartridge. Such magneto-optical disk may have an outer diameter of approximately 64 mm and a thickness of approximately 1.2 millimeters. Further, such magneto-optical disk may have a plurality of tracks for storing data with a track pitch of approximately 1.6 micrometers.

The above-described magneto-optical disk/cartridge may be similar to a so-called mini-disk (MD) used to record audio data. Such disk may record approximately 140 Mbytes of data, which corresponds to approximately 365 still pictures in JPEG-compressed form and approximately 40 minutes of audio information in a so-called ATRAC (Adaptive Transform Acoustic Coding) form.

The above-described electronic still camera which records data in a digital form onto a magneto-optical disk has numerous advantages. For example, a relatively large number of still image data may be recorded on one disk, the quality of the recorded images may remain substantially high and may not substantially deteriorate over time, compilation of data is relatively easy, and still image data may be copied into a computer. Furthermore, such use is believed to increase in the future.

Electronic still cameras, such as that described above which records a still image of an object in digital form on a magneto-optical disk, and other electronic still cameras, such as those which record a still image of an object in analog form on a magneto-optical disk, use optical view finders. Such optical view finders may be difficult for an inexperienced operator to use because the entire image of an object to be photographed may be difficult to comprehend. Additionally, an image photographed through an optical view finder may not be reproduced thereat (in situ). These difficulties or drawbacks may be overcome by using an electronic view finder, such as that illustrated in FIG. 10.

Such electronic view finder may display the image to be photographed; characters 102 which may indicate the current state of operation, place and date of the photograph; and patterns 101 of a frame or ornamentation for the display. Numerous patterns or characters may be available for display. Such patterns and/or characters may be generated or provided from a read only memory (ROM). Desired pattern(s) and/or character(s) from the ROM may be incorporated or combined into video image signals and the combined video image/pattern/character signals may be stored in an image memory.

The above-described technique of combining pattern and character signals from a ROM and storing the combined signal in an image memory may have several disadvantages. For example, information or data pertaining to the image of the original photograph in the image memory may be lost. Additionally, utilizing a ROM to provide patterns or characters on a screen may require an exclusive or dedicated ROM and, as such, may increase the scale or complexity of the circuit and the cost thereof.

OBJECTS AND SUMMARY OF THE INVENTION

An object of the present invention is to provide a video signal processing technique in which a video signal corresponding to an image of an original photograph, character information and pattern information are respectively stored in separate areas of an image memory.

Another object of the present invention is to provide a technique as aforesaid wherein a dedicated ROM is not utilize for storing character and pattern information.

A further object of the present invention is to provide a technique as aforesaid wherein the complexity and cost of the corresponding apparatus is relatively low.

In accordance with an aspect of the present invention, a video signal processing method is provided which comprises the steps of forming a luminance region for storing luminance data, a chromatic region for storing chromatic data, a character region for storing character data, and a pattern region for storing pattern data in an image memory; storing luminance data and chromatic data in the luminance region and the chromatic region, respectively; storing character data and pattern data in the character region and the pattern region, respectively; and incorporating the stored luminance data from the luminance region, the stored chromatic data from the chromatic region, the stored character data from the character region, and the stored pattern data from the pattern region into combined data, and displaying an image corresponding to the combined data.

Therefore, the image memory of the present invention includes a luminance region, a chromatic region, a character region and a pattern region for respectively storing luminance data, chromatic data, pattern data and character data. Character data stored in the character region and pattern data stored in the pattern region may be incorporated into luminance data and chromatic data stored in the luminance region and the chromatic region, respectively. This arrangement does not require a ROM for performing such operation and reduces or eliminates the risk of losing image information for a photograph.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENT

The preferred embodiment of the present invention will now be described with reference to the accompanying drawings.

Figure 1A:
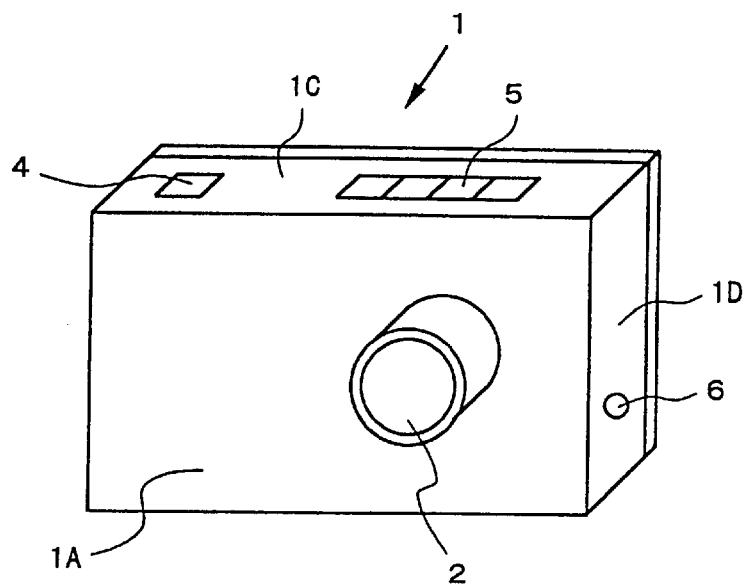
FIGS. 1A and 1B are perspective views of an electronic still camera according to an embodiment of the present invention.
Figure 1C:
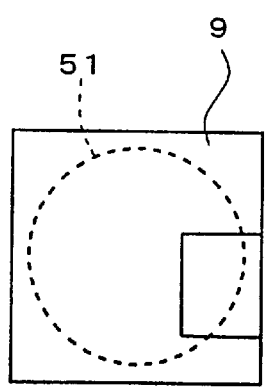
FIG. 1C is a diagram of a magneto-optical disk cartridge which may be used with the electronic still camera of FIGS. 1A and 1B.
Figure 1B:
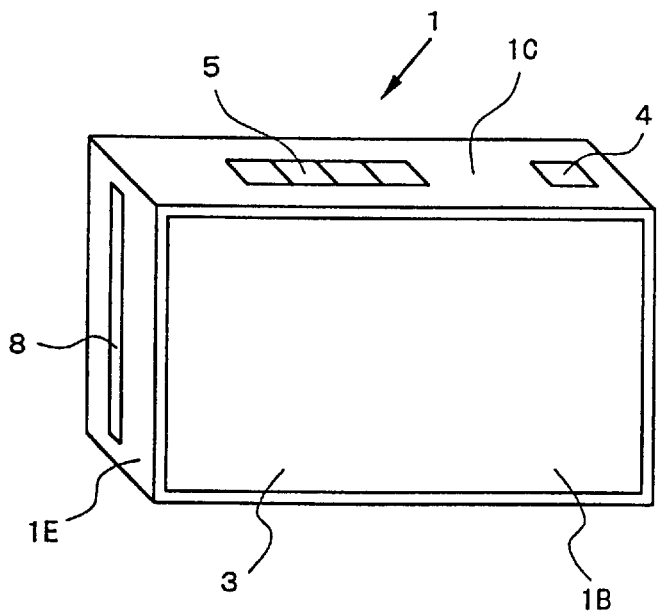

FIGS. 1A and 1B illustrate a digital type electronic still camera. Such electronic still camera is adapted to compress a digital still image video signal in accordance with a JPEG technique and to record the compressed signal on a magneto-optical disk which may be similar to a MD (minidisk) and to reproduce a recorded signal from such MD, as hereinafter more fully described.

PCT application No. JP95/01912 filed Sep. 21, 1995 filed entitled "Still Picture System" is hereby incorporated by reference.

As shown in FIGS. 1A and 1B, the present electronic still camera includes a main camera body 1 having a front surface 1A, a back surface 1B, a top surface 1C and side surfaces 1D and 1E. A lens 2 is arranged on the front surface 1A. The lens 2 is adapted to receive an image or light rays from an object to be photographed. A liquid crystal display 3 is arranged on the back surface 1B. The liquid crystal display 3 is adapted to display an image to be photographed or a reproduced image. Such liquid crystal display 3 may be utilized as a view finder. A shutter switch 4 and other various switches 5 are arranged on the top surface 1C. A video output terminal 6 is arranged on the side surface 1D and a disk loading aperture 8 is arranged on the other side surface 1E. Such disk loading aperture 8 is adapted to receive a recording medium such as a cartridge 9 containing a magneto-optical disk 51 shown in FIG. 1C.

The magneto-optical disk 51 may have a diameter of approximately 64 mm. The magneto-optical disk/cartridge arrangement may be similar to a musical or audio MD (minidisk), such as that previously described.

In operation, the lens 2 is oriented to a desired object when the electronic still camera is used to take a photograph. An image of such object is supplied through the lens 2 and is opto-electrically converted by a CCD photographic device 22 (FIG. 2) included in the main camera body 1 so as to form an image signal which is stored in an image memory 31 (FIG. 2) included in the main camera body and which is displayed on the liquid crystal display 3. When the shutter button 4 is activated or depressed, a still image corresponding to the image received through the lens 2 is recorded on the disk 51 in the cartridge 9.

A still image recorded on the magneto-optical disk 51 may be reproduced and displayed on the liquid crystal display 3. The still image recorded on the magneto-optical disk 51 may also be displayed on an external display screen, such as that of a television, if the video output terminal 6 of the main camera body 1 is coupled to a video input terminal of such television. Additionally, the still image recorded on the magneto-optical disk 51 may be retrieved or provided to a computer, such as a personal computer, and may be compiled therein with other data by utilizing an image compiling application program.

The present electronic still camera will now be more fully described with reference to FIG. 2.

Figure 2:
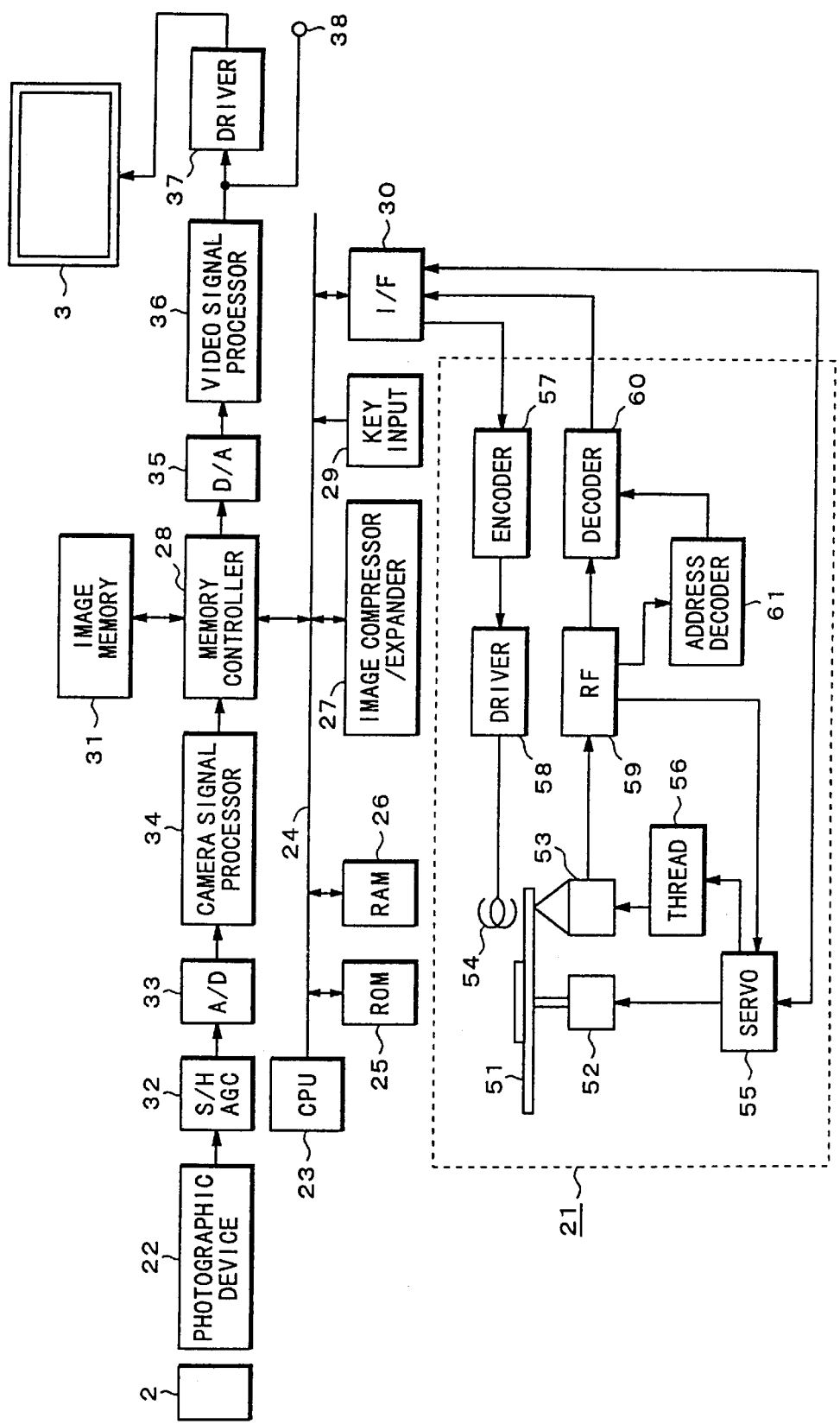
FIG. 2 is a diagram of the electronic still camera of FIGS. 1A and 1B.

The present electronic still camera generally includes the lens 2, the CCD device 22, a sample and hold and automatic gain control (AGC) circuit 32, an analog-to-digital (A/D) converter 33, a camera signal processing circuit 34, a memory controller 28, an image memory 31, a digital-to-analog (D/A) converter 35, a video signal processing circuit 36, a liquid crystal driving circuit 37, the liquid crystal display 3, a computer processing unit (CPU) 23, a ROM 25, a random access memory (RAM) 26, an image compressing/expanding circuit 27, input key(s) 29, an interface 30 and a magneto-optical disk drive circuit 21 which are connected as shown in FIG. 2. The magneto-optical disk drive circuit 21 generally includes a motor 52, an optical pick-up 53, a magnetic head 54, a servo circuit 55, a thread mechanism 56, an encoder 57, a driver 58, a RF circuit 59, a decoder 60, and an address decoder 61 which are connected as shown in FIG. 2.

The CPU 23 may control record/reproduce processing of the camera. For example, the CPU 23 may control the processing for recording video signals captured by the CCD photographic device 22 on the magneto-optical disk 51 in a compressed form, processing for expansion and reproduction of signals read from the magneto-optical disk 51, and so forth.

A CPU bus 24 connects the CPU 23, the ROM 25, the RAM 26, the image compression/expansion circuit 27, the memory controller 28, input keys 29, and the magneto-optical disk drive 21 through the interface 30.

The input keys 29 may enable an operator to input a desired command or function. One of the input keys 29 may be the shutter switch 4.

The ROM 25 and the RAM 26 may be utilized to store programs and/or information for use in the operation of the present camera.

The magneto-optical disk (or optical disk) 51 contained in a cartridge 9 may be loaded into the magneto-optical disk drive 21. A digital video signal compressed by a JPEG technique may be recorded on and reproduced from the magneto-optical disk 51. Data stored on the magneto-optical disk 51 may be accessed by use of respective addresses. Such addresses may be provided or recorded in accordance in a so-called Wobble format.

The magneto-optical disk 51 is rotated by the spindle motor 52. The optical pick-up 53 and the magnetic head 54 are arranged so as to be adjacent to the magneto-optical disk 51 and are adapted to move in a radial direction across the disk 51 by the thread mechanism 56. The servo circuit 55 receives a focus and tracking error signal from the RF circuit 59 and, in response thereto, generates a control signal(s) which is supplied to the spindle motor 52 and the thread mechanism 56. As a result, the spindle motor 52 and the thread mechanism 56 are controlled which, in turn provides focus and tracking control of a double-shaft or two-axes device of the optical pick-up 53.

As hereinafter more fully described, data to be recorded is supplied through the interface 30 to the encoder 57 so as to encoded in a predetermined manner. An encoded signal from the encoder 57 is supplied to the magnetic head 54 by way of the driver 58. As a result, a laser beam from the optical pickup 53 and a modulated magnetic field from the magnetic head 54 are applied to the magnetic disk 51.

During reproduction, a laser beam from the optical pick-up 53 is irradiated onto the magneto-optical disk 51 and reflected light therefrom is supplied to the RF circuit 59, wherein a reproduced signal is obtained. Such reproduced signal is supplied to the decoder 60 and the address decoder 61. The address decoder decodes or detects the Wobble addresses and provides a output to the decoder 60. As a result, a decoded signal is formed and supplied from the decoder 60 to the interface 30.

The lens 2 is disposed in front of the CCD photographic device 22. During recording, light from an object to be photographed is supplied through the lens 2 and focused onto a light detecting plane of the CCD photographic device 22 so as to be photo-electrically converted to an image signal. Such image signal is supplied through the sample and hold and/or AGC circuit 32 to the A/D converter 33 so as to be converted into digital form. The digital image signal from the A/D converter 33 is supplied to the camera signal processing circuit 34 so as to form component video signals, such as a luminance signal Y and chromatic difference signals R-Y (Red-Y) and B-Y (Blue-Y).

The data capacity or sampling rate of the Y, R-Y and B-Y signals from the camera signal processing circuit 34 may be expressed as a ratio, such as a ratio of the luminance information Y to the chromatic information R-Y to the chromatic information B-Y. More than one video signal ratio or mode may be utilized. For example, video modes or ratios of 4:2:0 (Main profile at main level) and 4:2:2 (Option) may be utilized.

According to ITU-R (ITU-Radio communication Sector) recommendation BT,601, the luminance signal Y is sampled at 13.5 MHz, and the chromatic signals are each sampled at 6.75 MHz (13.5/2 MHz). Such sampling rates may provide the 4:2:2 ratio.

On the other hand, the ratio of 4:2:0 may not always be fixed. That is, such ratio may change between 4:2:0 and 4:0:2 depending upon the respective line of a field. More specifically, on an odd line of a field, the ratio of Y:R-Y:B-Y may be 4:0:2. On the other hand, on an even line of the field, the ratio of Y:R-Y:B-Y may be 4:0:2. Thus, the ratio 4:2:0 and 4:0:2 is dependent upon the respective line and provides an indication or difference between the odd or even line of a field.

The camera signal processing circuit 34 may also perform additional processing, such as that pertaining to gamma correction, aperture correction, shading processing, and so forth.

Under control of the memory controller 28, the video signal from the camera signal processing circuit 34 is supplied to the image memory 31 and then to the D/A converter 35 so as to be converted into analog form. An analog output signal from the D/A converter 35 is supplied to the video signal processing circuit 36. An output from the video signal processing circuit 36 may be supplied through the liquid crystal driver 37 to the liquid display 3. Such liquid display 3 may be used as a view finder during photographing. The video signal processing circuit 36 may also form a composite video signal from the received analog signal. Such composite signal may have a predetermined format, such as that corresponding to an NTSC (national television system committee) format. The composite signal may be outputted from an analog video signal output terminal 38.

When the shutter button 4 (FIG. 1) is pressed during recording, a video signal of an image may be supplied to the image memory 31. That is, the video signal supplied to the image memory 31 may be first supplied to the image compression/expansion circuit 27 by way of the CPU bus 24. The image compression/expansion circuit 27 is adapted to compress and expand a digital video signal in accordance with a JPEG technique, wherein such JPEG compression technique may involve DCT conversion and variable-length coding of the digital video signal. The compressed video signal from the image compression/expansion circuit 27 may be supplied by way of the controller 28 to the image memory 31.

The compressed video signal from the image compression/expansion circuit 27 may be further supplied to the encoder 57 of the magneto-optical disk drive 21 by way of the CPU bus 24 and interface 30. The encoder 57 is adapted to perform error correction coding, such as that in accordance with ACIRC (Advanced Cross Interleaved Reed Solomon Coding), and to modulate the received signal in accordance with a predetermined modulation technique, such as a so-called eight-to-fourteen modulation technique. An output of the encoder 57 is supplied through the driver 58 to the magnetic head 54. The optical pick-up 53 directs a laser beam onto the magneto-optical disk 51, and a magnetic field modulated by an output of the encoder 57 is applied to the magnetic head 54. As a result, a video signal in compressed form may be recorded on the magneto-optical disk 51.

During recording, the video signal stored in the image memory 31 is supplied to the D/A converter 35 and an output therefrom is supplied to the video signal processing circuit 36. An output of the video signal processing circuit 36 is supplied through the liquid crystal driver 37 to the liquid crystal display 3. As a result, the photographed image is displayed on the liquid crystal display 3.

As hereinafter more fully described, the image memory 31 includes a luminance signal data area, a chromatic signal data area, a pattern data area and a character data area. Pattern data and character data may be respectively supplied to the pattern data area and character data area. The pattern data and character data may be combined with the luminance signal data and chromatic signal data.

During reproduction, an image to be reproduced is identified or designated by use of the input keys 29. Upon such designation, the optical pick-up 53 may be moved to the location or address corresponding to the designated recorded image, and compressed video signals representative of the designated image may be retrieved from the magneto-optical disk 51. In a manner similar to that previously described, such retrieved or reproduced signal is supplied to the decoder 60 by way of the RF amplifier 59 so as to be decoded or processed thereat. For example, such processing may involve data demodulation, error correction, and so forth. An output of the decoder 60 is supplied to the image compression/expansion circuit 27 by way of the interface 30 and the CPU bus 24. The image compression/expansion circuit 27 expands the received JPEG-compressed video signal which may be stored in the image memory 31 under the control of the memory controller 28. The stored video signal from the image memory 31 is supplied to the D/A converter 35 so as to be converted into analog form which is supplied to the video signal processing circuit 36. An output of the video signal processing circuit 36 is supplied to the liquid crystal display 3 by way of the liquid crystal driver 37. The video signal processing circuit 36 may form a composite video signal having a predetermined or NTSC format. Such composite video signal may be outputted at the analog signal output terminal 38.

In the present digital electronic still camera, a current photographed image may be displayed on the liquid crystal display 3 during recording. Additionally, characters which may indicate one or more predetermined items such as the current mode of operation, the place and date of the photograph and so forth, and patterns which may be utilized as ornamentation or a frame for the display may also be displayed. These patterns and characters may be stored in the image memory 31 together with luminance signals and chromatic signals and may be outputted in a combined form. A dedicated ROM is not utilized for generating or providing such patterns and characters. Instead, as hereinbelow more fully described, the image memory 31 is provided with separate storage areas for storing the luminance data, the chromatic data, the character data and the pattern data.

Figure 3:
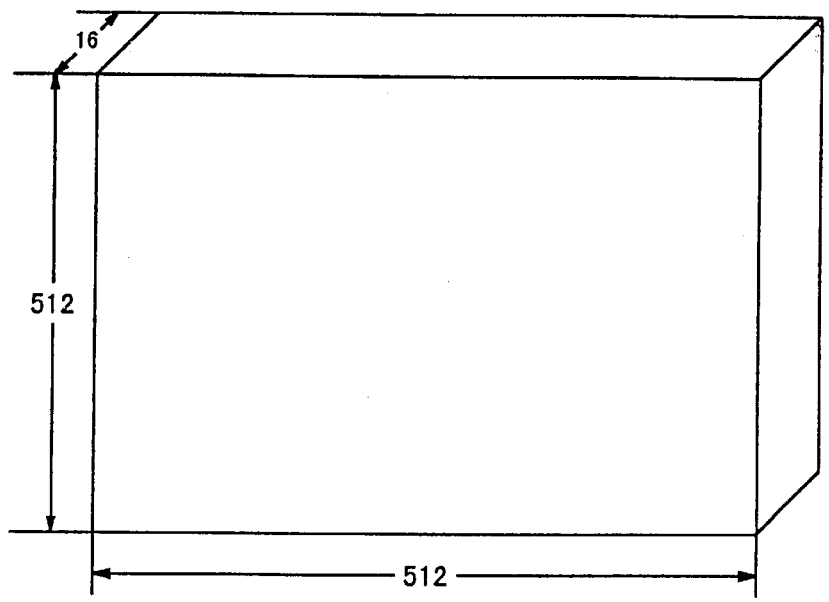
FIG. 3 is a diagram to which reference will be made in explaining an image memory in the electronic still camera of FIGS. 1A and 1B.

A 4 megabyte video RAM, as shown in FIG. 3, may be utilized as the image memory 31. Such video RAM is 512 bits wide, 512 bits high and 16 bits thick. The data capacity of this image memory 31 is as follows:

512×512×16=32 4,194,304 bits

Figure 4:
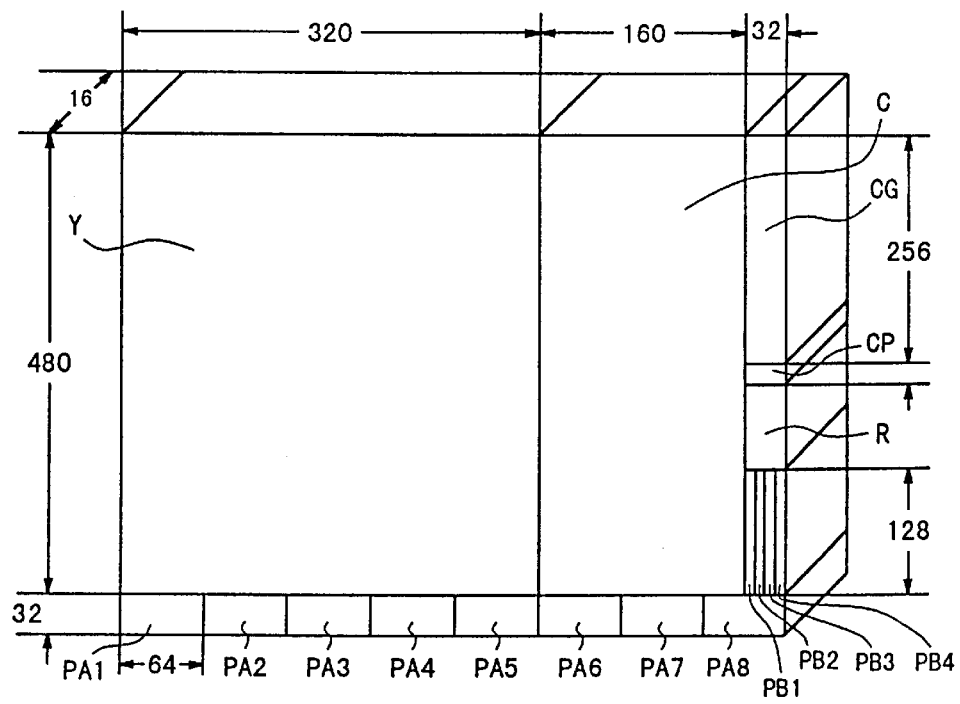
FIG. 4 is another diagram to which reference will be made in explaining the image memory in the electronic still camera of FIGS. 1A and 1B.

Data storage within the image memory 31 may be allocated as shown in FIG. 4 in which "Y" indicates the area for luminance signal data, "C" indicates the area for chromatic signal data, "CG" indicates the area for character data, "PA1" to "PA8" and "PB1" to "PB4" indicate areas for pattern data, "CP" indicates a color palette area, and "R" indicates a reserved area. The luminance data area Y is 320 bits wide (along a horizontal direction), 480 bits high (along a vertical direction) and 16 bits deep.

An image plane may contain 640 pixels in a horizontal direction by 480 pixels in a vertical direction. Such image plane contains 640×480=307,200 pixels or samples. This corresponds to the number of effective pixels in a NTSC image plane.

Figure 5A:
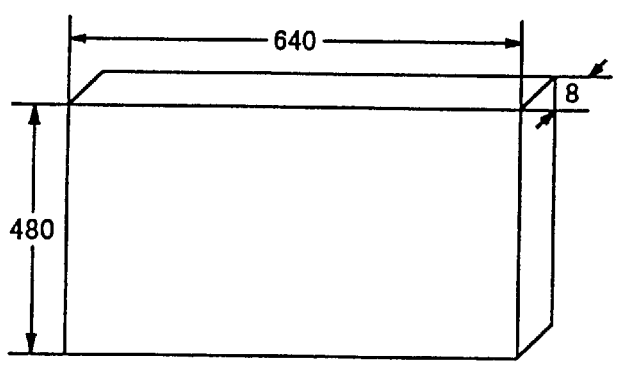
FIGS. 5A and 5B are other diagrams to which reference will be made in explaining the image memory in the electronic still camera of FIGS. 1A and 1B.

Consider the situation in which a luminance data signal is quantized by 8 bits. In this situation, the luminance data signal data may contain 640×480×8=2,457,600 bits. Accordingly, in this situation, a storage area having a capacity of at least 2,457,600 bits, such as that shown in FIG. 5A, should be used for the luminance data signal.

Figure 5B:
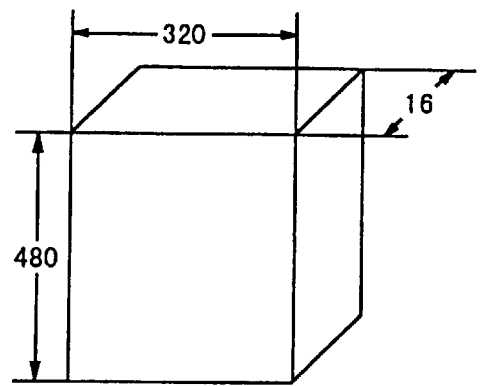

By utilizing a video RAM having a depth of 16 bits as the image memory 31, the above-described 2,457,600 bits of luminance signal data may be stored within an area Y having a size of 320 bits wide by 480 bits high as shown in FIG. 5B. (That is, 320×480×16=2,457,600 bits which equals the number of bits in the luminance signal data.)

Therefore, the luminance signal data area Y having an area of (320 bits×480 bits), as shown in FIG. 4, is sufficient for storing the luminance signal data.

With regard to the chromatic data, the chromatic data area C is 160 bits wide (along a horizontal direction), 480 bits high (along a vertical direction) and 16 bits deep, as shown in FIG. 4. More specifically, chromatic signals CR and CB each may have approximately ¼ the amount of information or data as compared to the luminance signal data. Accordingly, the storage capacity for each of the chromatic signal CR and the chromatic signal CB should be:

(640×480×8)/4=614,400 bits

As a result, the total storage capacity for the chromatic signals CR and CB should be 1,228,800 bits.

Figure 6:
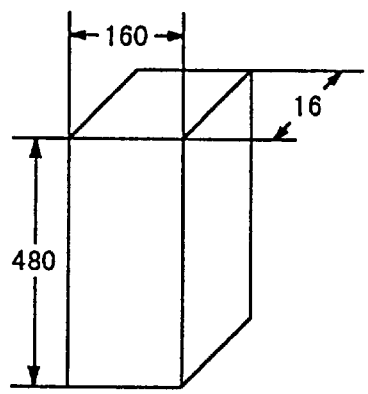
FIG. 6 is another diagram to which reference will be made in explaining the image memory in the electronic still camera of FIGS. 1A and 1B.

Thus, the chromatic data area C should have a storage area of 160 bits wide by 480 bits high when a video RAM having a depth of 16 bits is utilized, such as shown in FIG. 6. Such size storage area may accommodate 160×480×16=1,228,800 bits.

Therefore, the chromatic signal data area C having an area of (160 bits×480 bits), as shown in FIG. 4, is sufficient for storing the chromatic signal data.

The sum of the luminance signal data area Y and the chromatic signal data area C is (480×480). On the other hand, the area of the video RAM of FIG. 3 is (512×512). Accordingly, a L-shaped area having a thickness of 32 bits in both the horizontal and vertical directions is still available. Such L-shaped area may be used for the pattern data areas PA1 to PA8 and PB1 to PB4, and character data area CG, as hereinbelow more fully described.

With regard to the character data area, the character data area CG is 32 bits wide by 256 bits high by 16 bits deep, as shown in FIG. 4. Accordingly, the character data area CG has a storage capacity of 32×256×16=131,072 bits.

Figure 7A:
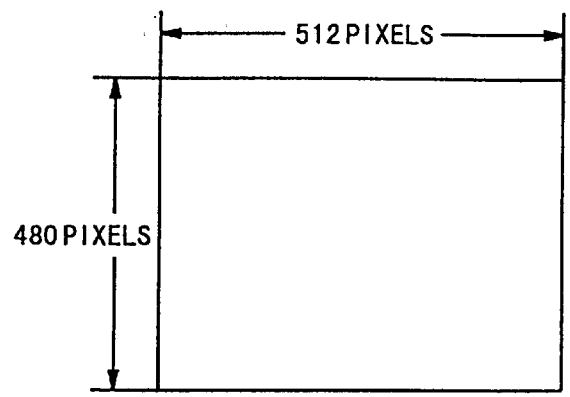
FIGS. 7A, 7B and 7C are other diagrams to which reference will be made in explaining the image memory in the electronic still camera of FIGS. 1A and 1B.
Figure 7B:
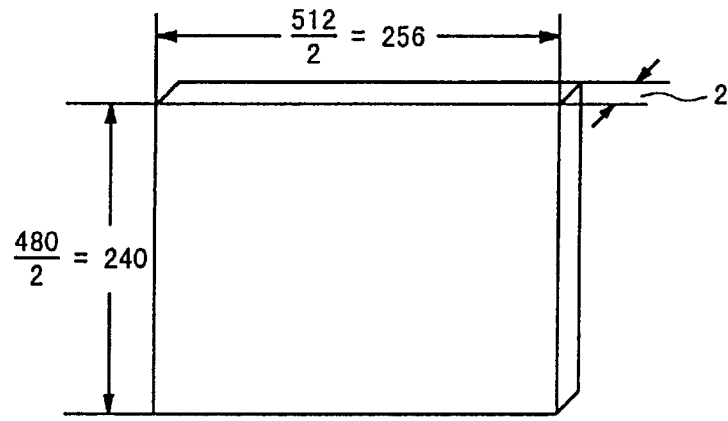

One image plane for display of characters may have 512 pixels in a horizontal direction by 480 pixels in a vertical direction as shown in FIG. 7A. For display of a character, assume that four samples in the horizontal and vertical directions may be represented as one sample and expressed with two bits. In this situation, as shown in FIG. 7B, the storage capacity should be as follows:

(512/2)×(480/2)×2=122,880 bits

Figure 7C:
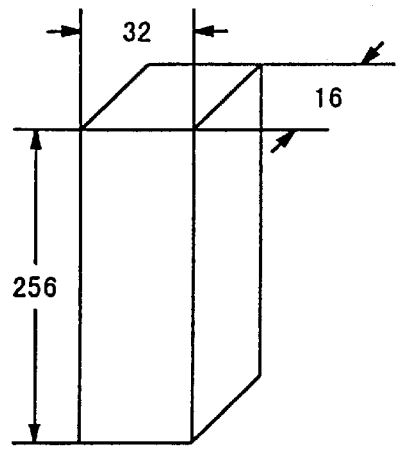

Thus, since the allocated storage area CG has a storage capacity larger than the needed storage capacity (i.e., 131,072 bits is larger than 122,880 bits), the character data area CG having an area of (32 bits×256 bits) when used with a video RAM having a depth of 16 bits, as shown in FIGS. 4 and 7C, is sufficient for storing the character data.

With regard to the pattern data area, pattern data areas PA1 to PA8 each having a size of 64 bits wide×32 bits bits wide×128 bits high may be utilized for storing pattern data, as shown in FIG. 4.

Figure 8A:
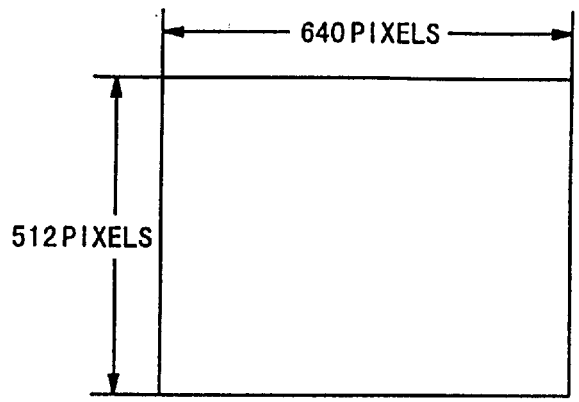
FIGS. 8A, 8B and 8C are other diagrams to which reference will be made in explaining the image memory in the electronic still camera of FIGS. 1A and 1B.
Figure 8B:
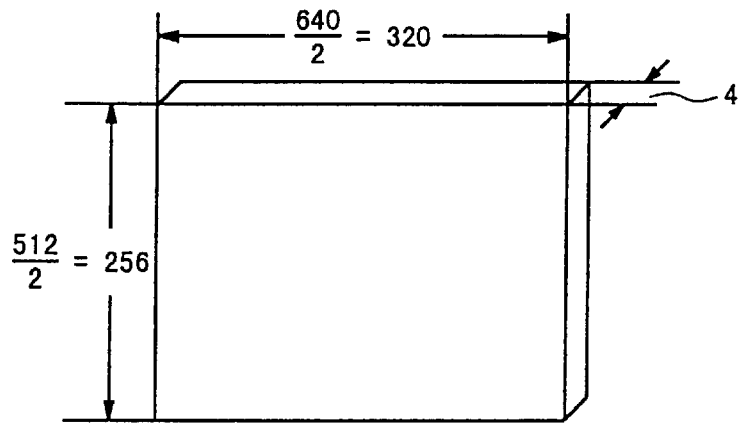

An image plane of pattern data may have 640 pixels in a horizontal direction and 512 pixels in a vertical direction as shown in FIG. 8A. This is slightly larger than the image plane for character data. For display of a pattern, assume that four samples in the horizontal and vertical directions may be represented as one sample which is expressed with four bits. In this situation, as shown in FIG. 8B, the storage capacity should be as follows:

$$(640/2) \times (512/2) \times 4 = 327{,}680 \text{ bits}$$

Figure 8C:
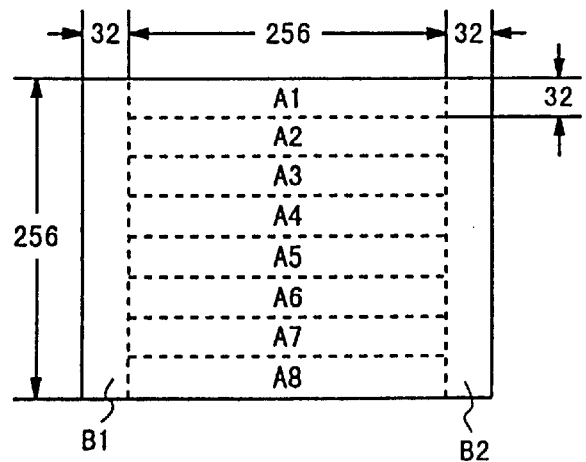
Figure 9A:
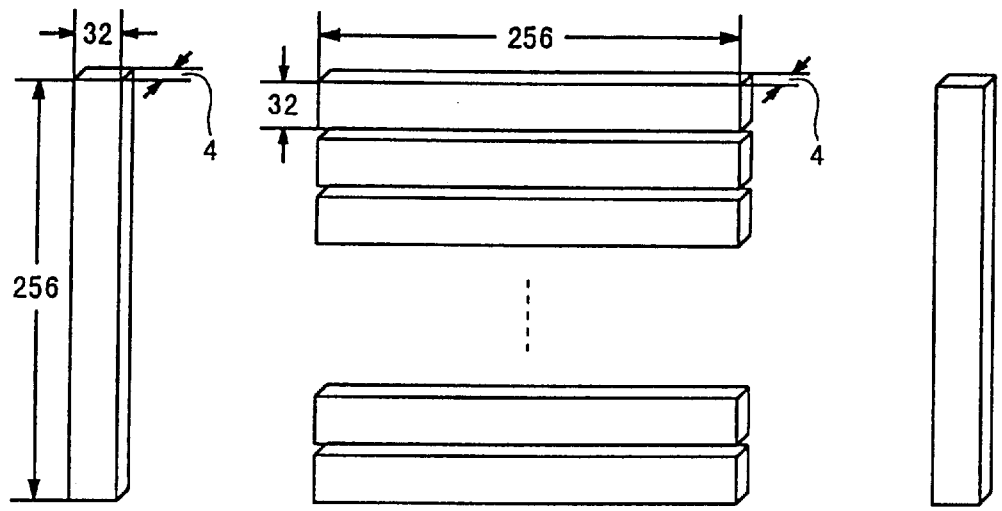
FIGS. 9A and 9B are other diagrams to which reference will be made in explaining the image memory in the electronic still camera of FIGS. 1A and 1B.

Each image plane of pattern data may be processed so as to have horizontally divided areas A1, A2, A3, ... A8 and vertically divided areas B1 and B2, as shown in FIG. 8C. As shown in FIG. 9A, each of the areas A1, A2, A3, ... A8 has a size of (256×32), and each of the areas B1 and B2 has a size of (32×256). Therefore, each of the areas A1, A2, A3 ... A8 should have a storage capacity of:

$$256 \times 32 \times 4 = 32{,}768 \text{ bits}$$

and each of the areas B1 and B2 should have a storage capacity of:

$$32 \times 256 \times 4 = 32{,}768 \text{ bits}$$

Figure 9B:
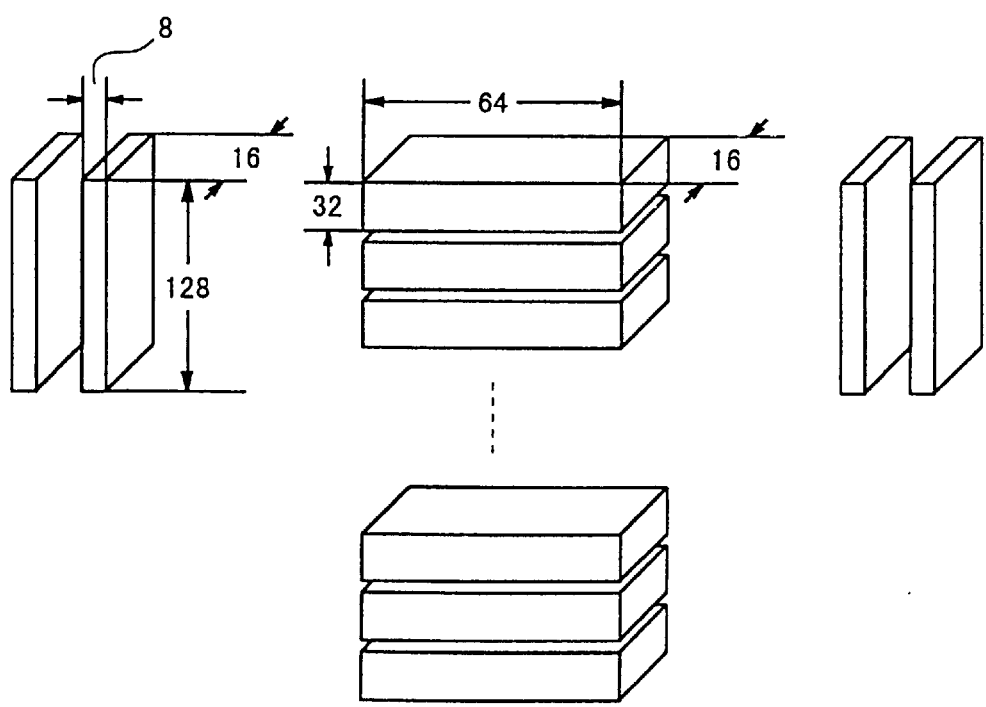
Figure 10:
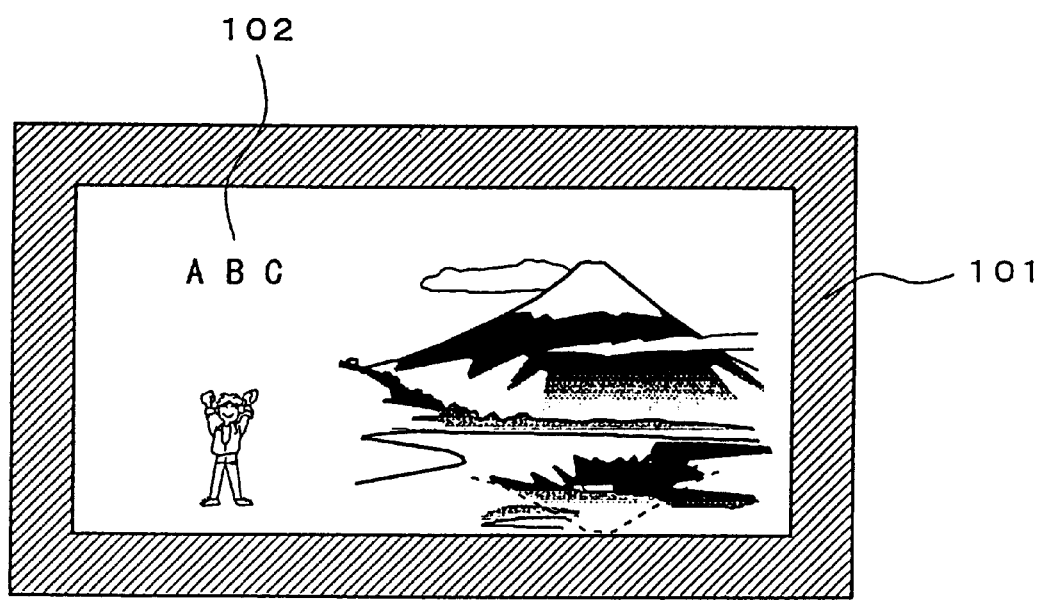
FIG. 10 is a diagram to which reference will be made in explaining the display of characters and patterns.

Each of the areas A1, A2, A3 ... A8 may utilize an area having a size of 64 bits wide by 32 bits high when allocated in a video RAM having a depth of 16 bits, as shown in FIG. 9B. That is, each such size enables 64×32×16=32,768 bits to be stored therein. Each of the areas B1 and B2 may utilize two areas each having a size of 8 bits wide by 128 bits high when allocated in a video RAM having a depth of 16 bits. That is, each such size enables 8×128×16=16,348 bits to be stored therein.

Therefore, pattern data of the areas A1, A2, A3, ... A8 may be allocated respectively to the pattern data areas PA1, PA2, PA3 ... PA8 each having a size of (32×64) as shown in FIG. 4. Data of the area B1 may be allocated to the pattern data areas PB2 and PB4 each having a size of (8×128), and data of the area B2 may be allocated to the pattern data areas PB1 and PB3 each having a size of (8×128).

The pattern data area described above with reference to FIG. 8A has a size of 640 pixels wide by 512 pixels high. In a NTSC image plane, the number of effective vertical lines or pixels is 480 and the number of effective horizontal lines or pixels is 512. In this situation, the storage capacity should be as follows:

$$480 \times 512 = 245{,}760 \text{ bits.}$$

Since 245,760/(32×64×16)=7.5 (areas), only 7.5 of the pattern data areas PA1, PA2, PA3 ... PA8 of (32×64×16) are needed. Accordingly, one half of the area PA8 is unused.

On the other hand, in an image plane of a PAL (pulse alternation by line) system, the number of effective vertical lines (pixels) is 512 and the number of effective horizontal lines (pixels) is 512. In this situation, the storage capacity should be as follows:

$$512 \times 512 = 262{,}144 \text{ bits.}$$

Since 262,144/(32×64×16)=8 (areas), the capacity of the eight pattern data areas PA1, PA2, PA3 ... PA8 of (32×64×16) are sufficient.

For character data using two bits, only four colors may be represented. For pattern data using four bits, only 16 colors may be represented. A color palette, which may be stored in the color palette area CP, may be utilized to enable representation of more colors.

Therefore, the present camera includes an image memory 31 having a character data area CG and pattern data areas PA1 to PA8 and PB1 to PB4 in addition to a luminance data area Y and a chromatic data area C for temporally storing luminance data and chromatic data based on a photographed image in the luminance data area Y and chromatic data area C, respectively, and for storing character data in the character data area CG and pattern data in the pattern data areas PA1 to PA8 and PB1 to PB4. When incorporation of characters or patterns into an image is desired, character data or pattern data stored in the character data area CG or pattern data areas PA1, PA2, PA3 ... PA8 and PB1 to PB4 may be combined into the luminance data and the chromatic data.

According to the present invention, by providing an image memory having a luminance region and a chromatic region for storing luminance data and chromatic data, a character region for storing character data, and a pattern region for storing pattern data so that character data stored in the character region and pattern data stored in the pattern region may be incorporated into luminance data and chromatic data stored in the luminance region and the chromatic region, a dedicated ROM is not needed for this operation and, furthermore, information pertaining to the image of a photograph may be prevented from being loss.

Although in describing the image memory of the present invention, specific sizes and numbers of storage areas were described, the present invention is not so limited. Instead, other sizes and numbers of such storage areas may be utilized.

Further, although the present camera was described as being used with a magneto-optical recording disk, the present invention is not so limited. Instead, other types of recording medium, such as magnetic tape, semiconductors, memory devices and the like, may be utilized.

Although a preferred embodiment of the present invention and modifications thereof have been described in detail herein, it is to be understood that this invention is not limited to this embodiment and modifications, and that other modifications and variations may be affected by one skilled in the art without departing from the spirit and scope of the invention as defined by the appended claims.

What is claimed is:

1. A video signal processing method comprising the steps of:

forming a luminance region for storing luminance data, a chromatic region for storing chromatic data, a character region for storing character data, and a pattern region for storing pattern data in a single image memory, in which the image memory has a L-shaped portion having a first section and a second section arranged substantially perpendicular to the first section and in which said character region is arranged in a portion of the first section of the L-shaped portion and said pattern region is arranged in another portion of the first section and in the entire second section of the L-shaped portion;

storing said luminance data and said chromatic data in said luminance region and said chromatic region, respectively;

storing said character data and said pattern data in said character region and said pattern region, respectively; and incorporating the stored luminance data from said luminance region, the stored chromatic data from said chromatic region, the stored character data from said character region, and the stored pattern data from said pattern region into combined data, and displaying an image corresponding to said combined data.

2. The video signal processing method according to claim 1, further comprising the step of forming a palette region in said image memory for storing palette data indicating chromatic information for said character data and said pattern data.

3. A video apparatus comprising:
photographic means for optoelectrically converting an image;
a single image memory for temporarily storing an image signal corresponding to the optoelectrically converted image, said single image memory having a luminance region and a chromatic region for respectively storing luminance data and chromatic data based on an output from said photographic means, said single image memory further having a character region and a pattern region for respectively storing character data and pattern data, said image memory having a L-shaped portion including a first section and a second section arranged substantially perpendicular to the first section in which said character region is arranged in a portion of the first section of the L-shaped portion and said pattern region is arranged in another portion of the first section and in the entire second section of the L-shaped portion, said character data stored in said character region and said pattern data stored in said pattern region being combined with said luminance data and said chromatic data stored in said luminance region and said chromatic region to form combined data; and
means for displaying an image corresponding to said combined data.

4. The video apparatus according to claim 3, wherein said image memory further includes a palette region for storing palette data indicating chromatic information for said character data and said pattern data.

5. A video memory controller for controlling a single video memory having a luminance data area for storing luminance data, a chroma data area for storing chroma data, a character data area for storing character data and a pattern data area for storing pattern data, said controller comprising:
read out means for respectively reading the luminance data, the chroma data, the character data and the pattern data from the luminance data area, the chroma data area, the character data area and the pattern data area of the video memory; and
means for combining the luminance data, the chroma data, the character data and the pattern data read from the video memory,
wherein the video memory has a L-shaped portion having a first section and a second section arranged substantially perpendicular to the first section and wherein said character data area is arranged in a portion of the first section of the L-shaped portion and said pattern data area is arranged in another portion of the first section and in the entire second section of the L-shaped portion.

6. The video memory controller according to claim 5, wherein the luminance data, the chroma data, the character data and the pattern data represent a plurality of pixels.

7. The video memory controller according to claim 6, wherein the chroma data includes a R-Y (red color signal-luminance signal) portion and a B-Y (blue color signal-luminance signal) portion and wherein a ratio of the amount of information of Y:R-Y:B-Y is 4:1:1.

8. The video memory controller according to claim 6, wherein the chroma data includes a R-Y (red color signal-luminance signal) portion and a B-Y (blue color signal-luminance signal) and wherein a ratio of luminance (Y), R-Y and B-Y data inputted to the video memory is one of 4:2:0 and 4:0:2.

9. The video memory controller according to claim 5, wherein the video memory can store approximately 4 Mbits of data.

10. The video memory controller according to claim 5, wherein the video memory can store approximately 4 Mbits of data in which the luminance data area can store approximately 2.5 Mbits, the chroma data area can store approximately 1.3 Mbits, and the character data and the pattern data areas can store the remaining amount of data.

11. The video memory controller according to claim 5, wherein the video memory can store color information corresponding to the character data and the pattern data.

12. A video memory apparatus for controlling a single video memory having a luminance data area for storing luminance data, a chroma data area for storing chroma data, a character data area for storing character data and a pattern data area for storing pattern data, said apparatus comprising:
a controller for respectively reading the luminance data, the chroma data, the character data and the pattern data representing a plurality of pixels from the luminance data area, the chroma data area, the character data area and the pattern data area of the video memory every (2×2) pixel unit; and
a combiner for combining the luminance data, the chroma data, the character data and the pattern data,
wherein the video memory has a L-shaped portion having a first section and a second section arranged substantially perpendicular to the first section and wherein said character data area is arranged in a portion of the first section of the L-shaped portion and said pattern data area is arranged in another portion of the first section and in the entire second section of the L-shaped portion.

13. A video reproducing apparatus comprising:
reproducing means for reproducing compressed data recorded on a recording medium;
means for expanding the compressed data and for producing luminance data, chroma data, character data and pattern data;
a single memory having a luminance data area for storing the luminance data, a chroma data area for storing the chroma data, a character data area for storing the character data and a pattern data area for storing the pattern data, in which the memory has a L-shaped portion having a first section and a second section arranged substantially perpendicular to the first section and in which said character data area is arranged in a portion of the first section of the L-shaped portion and said pattern data area is arranged in another portion of the first section and in the entire second section of the L-shaped portion;
control means for controlling writing and/or reading of data into and/or from each data area of the memory; and
means for combining the luminance data, the chroma data, the character data and the pattern data read from the memory and for displaying the combined data on a display device.

14. The video reproducing apparatus according to claim 13, wherein the luminance data, the chroma data, the character data and the pattern data represent a plurality of pixels and wherein the control means controls the memory so as to read the stored data every (2×2) pixel unit.

15. The video reproducing apparatus according to claim 13, wherein the chroma data includes a R-Y (red color signal-luminance signal) portion and a B-Y (blue color signal-luminance signal) portion and wherein a ratio of the amount of information of Y:R-Y:B-Y is 4:1:1.

16. The video reproducing apparatus according to claim 13, wherein the chroma data includes a R-Y (red color signal-luminance signal) portion and a B-Y (blue color signal-luminance signal) and wherein a ratio of luminance (Y), R-Y and B-Y data inputted to the video memory is one of 4:2:0 and 4:0:2.

17. The reproducing apparatus according to claim 13, wherein the video memory can store approximately 4 Mbits of data.

18. The reproducing apparatus according to claim 13, wherein the video memory can store approximately 4 Mbits of data in which the luminance data area can store approximately 2.5 Mbits, the chroma data area can store approximately 1.3 Mbits, and the character data and the pattern data areas can store the remaining amount of data.

19. The video reproducing apparatus according to claim 13, wherein the memory can store color information corresponding to the character data and the pattern data.

20. A digital still camera apparatus comprising:
    camera means for converting a still image to an image data signal;
    compressing means for compressing the image data signal;
    recording means for recording the compressed image data signal on a recording medium;
    reproducing means for reproducing the recorded compressed image data signal from the recording medium;
    means for expanding the reproduced compressed image data signal and for producing luminance data, chroma data, character data and pattern data;
    a single memory having a luminance data area for storing the luminance data, a chroma data area for storing the chroma data, a character data area for storing the character data and a pattern data area for storing the pattern data, in which the memory has a L-shaped portion having a first section and a second section arranged substantially perpendicular to the first section and in which said character data area is arranged in a portion of the first section of the L-shaped portion and said pattern data area is arranged in another portion of the first section and in the entire second section of the L-shaped portion;
    control means for controlling writing and/or reading of data into and/or from each data area of the memory; and
    means for combining the luminance data, the chroma data, the character data and the pattern data read from the memory and for displaying the combined data on a display device.

21. The digital still camera apparatus according to claim 20, wherein the luminance data, the chroma data, the character data and the pattern data represent a plurality of pixels and wherein the control means controls the memory so as to read the stored data every (2×2) pixel unit.

22. The digital still camera apparatus according to claim 20, wherein the chroma data includes a R-Y (red color signal-luminance signal) portion and a B-Y (blue color signal-luminance signal) portion and wherein a ratio of the amount of information of Y:R-Y:B-Y is 4:1:1.

23. The digital still camera apparatus according to claim 20, wherein the chroma data includes a R-Y (red color signal-luminance signal) portion and a B-Y (blue color signal-luminance signal) and wherein a ratio of luminance (Y), R-Y and B-Y data inputted to the video memory is one of 4:2:0 and 4:0:2.

24. The digital still camera apparatus according to claim 20, wherein the memory can store approximately 4 Mbits of data.

25. The digital still camera apparatus according to claim 20, wherein the memory can store approximately 4 Mbits of data in which the luminance data area can store approximately 2.5 Mbits, the chroma data area can store approximately 1.3 Mbits, and the character data and the pattern data areas can store the remaining amount of data.

26. The digital still camera apparatus according to claim 20, wherein the memory can store color information corresponding to the character data and the pattern data.

27. A digital camera apparatus comprising:
    a lens for receiving an image to be photographed;
    means for processing the photographed image to form an image data signal having a luminance (Y) data portion and chromatic difference data portions (R-Y) and (B-Y);
    compressing means for compressing the image data signal;
    recording means for recording the compressed image data signal on a recording medium;
    reproducing means for reproducing a recorded compressed image data signal from the recording medium;
    means for expanding the reproduced compressed image data signal to obtain the luminance (Y) data portion and the chromatic difference data portions (R-Y) and (B-Y);
    means for producing character data and pattern data;
    a single memory means having a luminance data area, a chroma data area, a character data area and a pattern data area, in which the memory means has a L-shaped portion having a first section and a second section arranged substantially perpendicular to the first section and in which said character data area is arranged in a portion of the first section of the L-shaped portion and said pattern data area is arranged in another portion of the first section and in the entire second section of the L-shaped portion, for respectively storing therein the luminance (Y) data portion, the chromatic difference data portions (R-Y) and (B-Y), the character data and the pattern data;
    control means for controlling writing and/or reading of data into and/or from each data area of the memory means; and
    means for combining the luminance data, the chroma data, the character data and the pattern data read from the memory means and for displaying the combined data on a display device.

28. A digital camera apparatus for recording and/or reproducing an image onto and/or from a recording medium, said apparatus comprising:
    means for inputting character data and pattern data;
    means for receiving an image data signal having a luminance (Y) data portion and chromatic difference data portions (R-Y) and (B-Y);

a single memory means having a luminance data area, a chroma data area, a character data area and a pattern data areas in which the memory means has a L-shaped portion having a first section and a second section arranged substantially perpendicular to the first section and in which said character data area is arranged in a portion of the first section of the L-shaped portion and said pattern data area is arranged in another portion of the first section and in the entire second section of the L-shaped portion, for respectively storing therein the luminance (Y) data portion, the chromatic difference data portions (R-Y) and (B-Y), the character data and the pattern data;

means for combining the luminance data, the chroma data, the character data and the pattern data from the memory means; and means for displaying the combined data.

29. The digital camera apparatus according to claim 28, wherein said recording medium is a magneto-optical disk.

* * * * *